Figure 1:
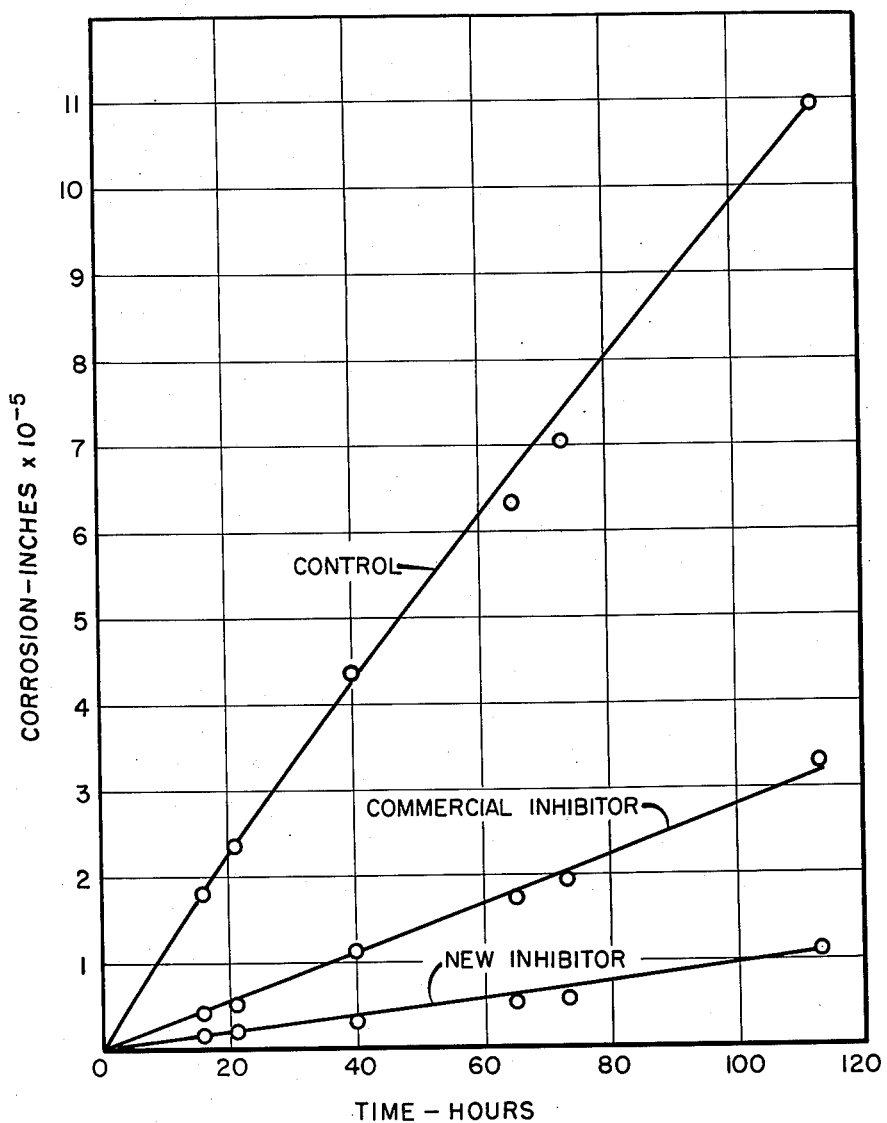

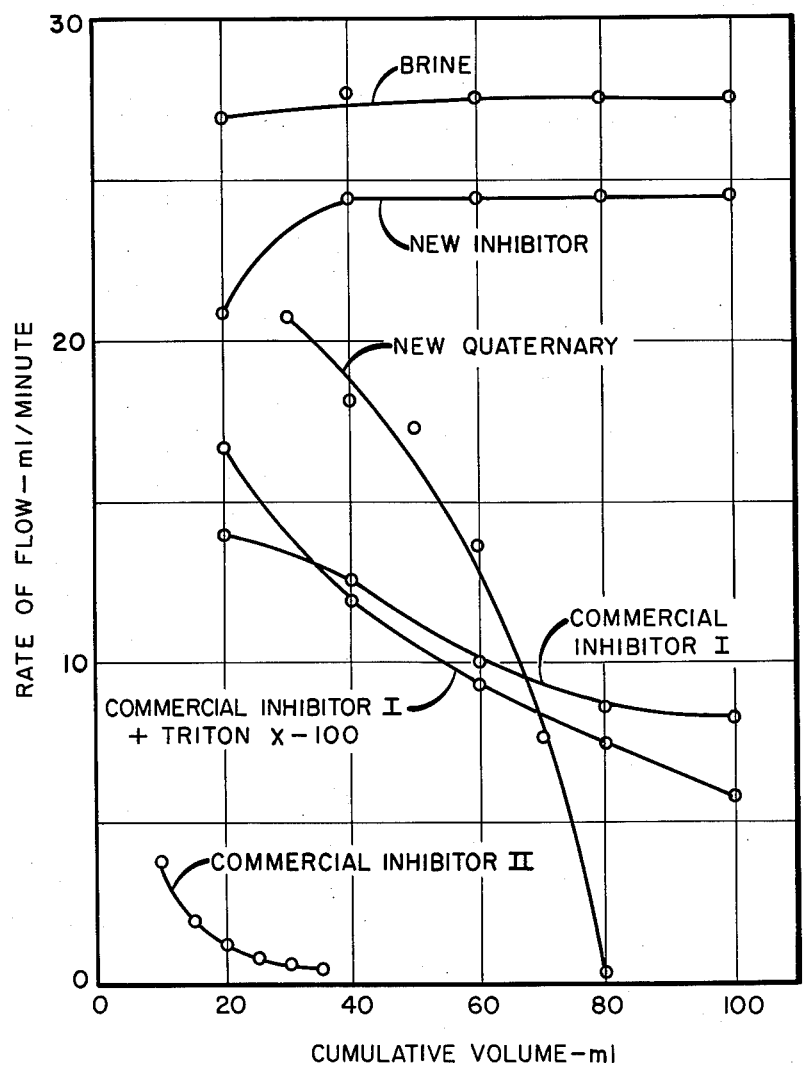
FIGURE—2

3,033,784
WATER SOLUBLE CORROSION INHIBITOR AND BACTERICIDE
Loyd W. Jones, Tulsa, Okla., assignor to Pan American Petroleum Corporation, Tulsa, Okla., a corporation of Delaware
Filed May 13, 1959, Ser. No. 812,844
8 Claims. (Cl. 252—8.55)

This invention relates to water treatment. More particularly, it relates to inhibiting corrosion and killing bacteria in water systems such as those used in water-flooding or water-disposal operations in oil fields.

Water used in many modern water-flooding or water-disposal operations may contain corrosive agents such as hydrogen sulfide, carbon dioxide, and low-molecular weight organic acids. These corrosive materials may rapidly corrode metal equipment used in the wells or on the surface of the earth. The water may also contain bacteria. These are objectionable since they may generate in the water corrosive materials such as hydrogen sulfide and the like. Bacteria are also objectionable since they tend to collect in colonies on the metal surfaces. Severe corrosion can occur under such colonies due to the corrosive gases generated. In addition, large pieces of the colonies frequently break loose, are pumped down the well, and plaster over the face of the formation into which the water is being injected.

Many efforts have been made to control corrosion and growth of bacteria. Several inhibitors and bactericides are now offered commercially for use in water systems. Some of the bactericides, particularly the quaternary ammonium compounds, have fair corrosion inhibiting properties. Some of the corrosion inhibitors, for example the amines, have fair bactericidal properties. A fundamental difficulty is that a good corrosion inhibitor should be substantially water insoluble. This is necessary to prevent removal of the inhibitor from metal surfaces by the large volumes of water which are ordinarily employed in water-flooding and water-disposal operations. To be highly effective as a bactericide, however, the inhibitor should be water soluble. It must not separate from the water but must remain distributed throughout the water where it can contact bacteria for a sufficient length of time to kill them.

The means most commonly used for overcoming the difficulty is to use both a bactericide and a corrosion inhibitor. Due to the large volume of water handled in many cases, the cost of two additives frequently becomes prohibitive. The cost of providing an effective concentration of even one additive is usually high.

An additional item of expense is the continuous injection of bactericides. As just noted, bacteria are troublesome principally because of the colonies which grow on the metal surfaces. If a film-forming bactericide could be developed, this should solve two problems. First, an intermittent injection of the material should then be satisfactory, and second, the bactericide would be concentrated in the location where it would do the most good.

Recently, still another problem has faced marketers of inhibitors and bactericides. A porous plastic disc or wafer has been developed having a rather low permeability to water. Many operators of water injection systems now employ these wafers to measure the tendency of waters to plug formations into which they are injected. The wafers are called Millipore filters. An article describing these filters and their use is found in the Petroleum Engineer for November 1956, page B53. Water which will quickly plug these filters has been used in many injection systems for long periods of time with little difficulty. It will be apparent, however, that many formations having low permeabilities of the same order as that of the Millipore filters are seriously plugged by such water. Therefore, it has become customary for many operators to insist that water containing any bactericide or corrosion inhibitor be able to pass a Millipore filter test before the bactericide or inhibitor is approved for use.

Several water-insoluble corrosion inhibitors are available in water dispersible forms. Some of these dispersions will not pass the Millipore filter test. In addition, while these dispersions are generally adequately stable for their intended purpose, it has been found that they usually will not remain stable for the long periods of residence in surge tanks or storage tanks of water injection systems. The result is that most of the inhibitors float to the top or settle to the bottom of the tanks and are lost from the main body of water. In addition, many flooding waters contain oil which is separated from the flooding water before the water is injected into wells. The oil-soluble inhibitors tend to separate from the water with the oil and are thus lost from the system. This again brings up the dilemma of a truly water-soluble inhibitor which will form a water insoluble film on metal surfaces.

An object of my invention is to provide an improved composition for inhibiting corrosion by agents soluble in water, and inhibiting bacterial growth in water. A more specific object is to provide an aqueous injection fluid with a decreased tendency to promote bacterial growth or corrode metal parts with which it is in contact. A further specific object is to provide an inexpensive additive for water which will perform the dual function of inhibiting corrosion by the corrosive agents normally present in oil field brines and at the same time act as a bactericide to kill the bacteria which are frequently present. A still more specific object is to provide a corrosion-inhibiting bactericide which is water-soluble to such an extent that it will pass a Millipore filter, but which will form a water-insoluble film on metal surfaces. Other objects will appear to those skilled in the art from the following description.

I have found that an inexpensive quaternary ammonium compound can be prepared from mixed high-boiling polyalkyl pyridines formed in certain ways. The quaternaries are prepared by reacting the mixed polyalkyl pyridines with quaternizing agents, preferably an alkyl or aryl alkyl halide such as methyl iodide, ethyl bromide, benzyl chloride or the like. The resulting quaternary has a high tendency to form films on metal surfaces. A correspondingly good corrosion inhibiting action results. Unfortunately, however, the quaternary is much too water-insoluble to act as a good bactericide. In addition, the composition in water tends to plug Millipore filters.

I have also found, however, that a solubilized form of my quaternary can be prepared which passes a Millipore filter and remains in solution but still deposits a tenacious film on metals. The film acts not only as a corrosion inhibitor but also as a bactericide. It will be apparent that the action of my inhibitor composition is dependent upon two things: first, the unique film-forming properties of the quaternary, and second, dispersing or solubilizing the quaternary in the water. The solubilizing action is performed by a surface active agent.

The combination of quaternary ammonium compound and surface active agent is sometimes a viscous semisolid mass not easily usable in the field. This depends on the nature of the surface active agent used. The composition can be converted to a liquid having a surprisingly low pour point, however, by the addition of a little solvent such as methanol. Preferably, the composition should also contain a small amount of water. The water seems to prehydrate the surface active agent and thus assist this agent in solubilizing the quaternary ammonium compound. A representative composition is as follows:

| | Percent by weight |
|---|---|
| Mixed polyalkyl pyridines quaternized with benzyl chloride | 40 |
| Nonyl phenol reacted with 10 moles of ethylene oxide | 10 |
| Tridecyl alcohol reacted with 40 moles of ethylene oxide | 5 |
| Isopropyl alcohol | 30 |
| Water | 15 |

The mixed polyalkyl pyridines are preferably obtained by reacting ammonia and acetaldehyde, extracting the reaction product with acid and distilling from the extract the low-boiling alkyl pyridines. The residue boiling between about 200 and about 350° C., is the desired material. One other suitable mixture of polyalkyl pyridines exists. It can be obtained by the vapor phase reaction of acetylene and ammonia to produce nitriles and alkyl pyridines. After the nitriles have been removed and the low-boiling alkyl pyridines have been distilled off, the residue boiling above about 200° C. is a mixture of polyalkyl pyridines suitable for my purpose. A commercial product representative of the ammonia-aldehyde reaction can be obtained under the trademark Alkyl Pyridines HB. A material representative of the ammonia-acetylene reaction is available under the trademark PAP. The term "high-boiling" when used hereinafter should be interpreted to mean boiling above a temperature of about 200° C.

The reactions of ammonia with acetylene and with acetaldehyde can be carried out under a wide variety of conditions. As far as I have been able to determine, at least some high-boiling mixed polyalkyl pyridines suitable for my purposes are always produced. It will generally be advisable to concentrate these materials by acid extraction, distilling off the low-boiling compounds or both, as previously noted. The acid-insoluble and low-boiling materials do not seem to have any objectionable effects, however, but simply act as diluents. Therefore, it is possible to use the entire reaction products.

The quaternizing agent can vary widely. Ordinarily, the molecular weight of the quaternizing agent is important in bactericides. This is demonstrated in the article, "Quaternary Ammonium Salts as Germicides" by G. H. Harris et al. in the Journal of the American Chemical Society, vol. 73, page 3959. The molecular weights of corrosion inhibiting compounds are also frequently critical. The lack of criticality in my compound possibly is due to the wide distribution of molecular weights in the mixed polyalkyl pyridines. Regardless of the molecular weight of the quaternizing agent, there seems to be a fraction of the polyalkyl pyridines which will form a quaternary ammonium compound having optimum properties from a bactericidal and a corrosion inhibiting standpoint. The fractions optimum for the two purposes may even be different but both are still present in the mixture.

An advantage of the freedom of choice of quaternizing agent is the possibility of selecting an inexpensive agent. For example, ethyl chloride is obtainable at less than 20 cents per pound. Some of the high molecular weight halides are as much as ten times as expensive. When inexpensive quaternizing agents are used with materials such as Alkyl Pyridines HB, which are also available at less than 20 cents per pound, unusually inexpensive quaternary ammonium compounds result. When it is considered that these inexpensive compounds perform a dual function of killing bacteria and inhibiting corrosion, it will be apparent that a good practical answer to the long-standing problem of treating flooding waters and the like has been provided.

In addition to the preferred alkyl and aralkyl halides, other organic quaternizing agents can be used. These may include sulfates such as diethyl sulfate, oxygen-containing chemicals such as chloroacetophenone or dichlorodiethyl ether, or unsaturated compounds such as allyl chloride or ethylene chloride. Still others will occur to those skilled in the art.

Before considering the nature of the surface active agent which should be employed, the nature of the solubilized quaternity should be considered. In the solubilized form, the quaternary appears to be completely in solution, in that, the solution seems perfectly clear to the eye. Such "solutions" have been variously called transparent emulsions, colloidal dispersions, colloidal solutions and the like. All these terms correctly imply that the ordinarily water-insoluble quaternary molecules are dispersed in the water in groups larger than unimolecular in size. The size of molecular groups depends upon the nature and concentration of the salts in the water and the nature and concentration of the solubilizing surface active agent.

For my purposes, the surface active agent requirement is a simple one. The agent should be capable of dispersing or solubilizing my normally water-insoluble quaternary in the particular brine in question to such a degree that the solution is substantially clear. That is, the solution is at worst slightly hazy. Since the degree of dispersion depends on the concentration and nature of the salts as well as the concentration and nature of the surface active agent, and since injection waters vary widely in the types and concentrations of salts present, it will be apparent that surface active agents which give a very adequate degree of dispersion of the quaternary in one brine may give a completely inadequate degree of dispersion in another. The unique film-forming action of my quaternary which performs its dual function of inhibiting both corrosion and bacterial growth depends simply on the quaternary being dispersed into the specific brine in question to a degree in which the solution is clear or nearly so. Most surface active agents will be operable to give an adequate dispersion of the quaternary in at least some water solutions if used in the proper concentration range. I have found, however, that some limits exist to surface active agents which can be used.

Tests explained in more detail in Example VI show that the surface active agent should be water soluble and should be ethoxylated. That is, it should be a reaction product of ethylene oxide with some other material and thus contain a polyoxyethylene radical. The agent should also contain a hydrocarbon radical having at least about 12 carbon atoms, at least about 8 of which are in an aliphatic portion. These limitations exclude agents known to be inoperable. As far as I am aware, all surface active agents meeting these requirements are operative to disperse my quaternary to the desired degree in at least some water or brine.

Since so many injection waters are brines, the surface active agent should preferably be nonionic in nature. This avoids the possibility of undesirable reactions between salts in the brines and ionic surface active agents. An even more highly preferred class of agents is the ester-free ether type of nonionic. This smaller class is preferred since its members are not subject to the hydrolysis which can cause decomposition of the ester type nonionics. This smaller class is made up of ethoxylated mercaptans, alcohols and alkyl phenols.

As previously noted, not all surface active agents will disperse my quaternary to the required degree in all brines. The suitability of any particular agent in any specific brine can be easily determined, however, by a simple routine test. For example, compositions containing 20, 40, 60, and 80 percent as much surface active agent as quaternary can be prepared. Ten parts of each composition is then dissolved in 90 parts of the brine to form 10 percent solutions. Portions of the 10 percent solutions can be diluted with additional brine to 1 percent concentrations of the inhibitor composition. These in turn can be further diluted to 0.5 percent, 0.1 percent solutions (1,000 parts per million), or the like. The solutions are then examined visually to determine if they are substantially clear. The particular agent in any given concentration should be considered satisfactory if it causes the inhibitor composition to form a substantially clear one-half percent solution in the specific brine. This examination will show in what ratio of agent to quaternary the particular agent can be used in the specific brine, if it can be used at all. The term "substantially clear" should be interpreted to mean that a typewritten sheet can be read through about one inch of the solution.

Occasionally, a 10 percent solution will be turbid while more dilute solutions are quite clear. It will be apparent that inhibitor compositions producing such results can be used in dilute concentrations. Other compositions produce clear 10 percent solutions in some brines but more dilute solutions are turbid. It will ordinarily be undesirable to use these compositions in dilute solutions. It is advisable to avoid use of compositions which form turbid suspensions in any concentration range in a specific brine in question. Since erratic results are obtained at high concentrations, they may also occur at lower concentrations in the range of 10 or 20 parts per million ordinarily used. If substantially clear solutions are produced at 10, 1 and 0.1 percent concentrations of a composition in a specific brine, on the other hand, lower concentrations have always been found to be satisfactory.

Ethoxylated surface active agents are ordinarily produced by reacting the alcohol, acid, mercaptan or the like with ethylene oxide. Under these circumstances, not all molecules receive the same number of oxyethylene groups. That is, the polyoxyethylene radicals have various lengths, the average length being the number of ethylene oxide molecules per molecule of alcohol, acid or the like, in the original mixture. This distribution of lengths of polyoxyethylene radicals seems to be important to the dispersing action. In some cases, the natural distribution is not sufficiently wide. In these cases it may be advisable to blend two reaction products to obtain a wider distribution of polyoxyethylene radicals. For example, a very effective dispersing agent can be prepared by mixing two surface active agents. One may be the reaction product of one mole of nonyl phenol with 10 moles of ethylene oxide while the other is the reaction product of one mole of nonyl phenol with 20 moles ethylene oxide. If these two agents are mixed in equal proportions, the average length of the polyoxyethylene radicals will be 15 ethylene oxide groups. The lengths of the polyoxyethylene radicals are, however, distributed over a much wider range than when one mole of nonyl phenol is reacted with 15 moles of ethylene oxide. Due to the wider distribution of polyoxyethylene radical lengths, the mixture of agents has properties somewhat different from those of the unmixed reaction products.

A particularly desirable mixture of agents contains about two parts of the reaction product of one mole of nonyl phenol with 10 moles of ethylene oxide and one part of the reaction product of one mole of tridecyl alcohol with 40 moles of ethylene oxide. This mixture of agents has been effective in dispersing my quaternary in all types of brines tested to date containing less than about 200,000 parts per million of salt. Few, if any, other agents are so universally effective.

In general, the average polyoxyethylene radical should have a length of between about 8 and about 30 ethylene oxide units. Ordinarily, higher ethylene oxide contents should be used for agents having large hydrophobic radicals and for agents to be used in brines having high salt contents. Preferably, the average polyoxyethylene radicals should have lengths averaging between about 10 and about 20 ethylene oxide units.

As little as 10 percent as much surface active agent as quaternary ammonium compound is satisfactory in some cases. I prefer, however, to use between about 20 and about 50 percent as much surface active agent as quaternary for best results. Even more surface active agent up to an amount equal to that of the quaternary, may be used if desired, but the principal effect is to simply dilute the quaternary ammonium compound. In any particular case enough surface active agent should be used to cause the composition to form a substantially clear solution when diluted with the particular water to be handled.

The liquid for decreasing viscosity and pour point may be any of several solvents. It should be highly soluble in water. Solvents such as carbon tetrachloride, carbon disulfide or hydrocarbons which may form a separate phase should be avoided. Other solvents such as ethyl acetate, diethyl ether or methyl ethyl ketone which are slightly water soluble are operable. Preferably, however, solvents which are completely water miscible or nearly so should be used. They should be mutual solvents for water, the quaternary and the surface active agent. Examples of such solvents include acetone, p-dioxane, dioxolane, tetrahydrofuran and methylcellosolve. The low-molecular weight alcohols make up the class of solvents most suitable for my purpose. This is because methanol, ethanol and isopropanol are all inexpensive, low-viscosity solvents for water, the surface active agent and the quaternary ammonium compound.

As previously noted, no solvent at all is really necessary except to make the composition sufficiently fluid to be handled in the field and to decrease the pour point to avoid gelation in cold weather. Thus, the minimum concentration is 0. A sufficient amount of the solvent should be used to provide the desired viscosity and pour point. In the case of the alcohol, this amount is usually about 20 to 50 percent by weight of the entire composition including the alcohol. More or less may be used depending upon the circumstances.

A small amount of water is preferably added to the composition before mixing into the main body of water. About 10 to 20 percent by weight of the entire composition is generally desirable. No water at all is necessary for satisfactory operation but improved dispersion is noted when the small amount of water is premixed.

The treating composition may be introduced into the water system in any of several ways. Preferably, it should be injected at as early a point in the system as possible. For example, if flooding water is being obtained from a well, the treating composition may be introduced into the annular space between the tubing and casing of the well. The metal surfaces of this well, of the water-handling equipment on the surface of the earth, and in the injection wells are thus protected. A convenient point of addition is the intake of the injection pumps. Addition of the treating composition may be continuous. Since the quaternary ammonium compound is such a strong film former, however, it will frequently be found desirable to add the composition intermittently. Such intermittent treatment will not ordinarily kill all the bacteria in the system, but the strong film of inhibitor on metal surfaces inhibits the growth of colonies of bacteria on these surfaces where they are most troublesome.

Another advantage of the intermittent batch treatment technique is that it permits the use of brine containing a low concentration of salt for preparing the batch of water containing the inhibitor. As previously noted, the amount and type of surface active agent should be varied for brines of different concentrations and pH. The use of the high concentrations of surface active agents required to obtain clear solutions in concentrated brines increases the cost of the composition considerably. By using batches of fresh water or of brines containing little salt, it is possible to obtain clear solutions by the use of low concentrations of the less expensive surface active agents.

As noted in Example VIII, many agents are more effective in dispersing my quaternary if the mixed agent and quaternary are first diluted considerably with fresh water before mixing the inhibitor composition into the brine. For this reason, even when continuous injection of the inhibitor is to be employed, it will sometimes be best to dilute the inhibitor composition with fresh water before injection into the brine. For example, about 10 parts of the composition can be mixed first with about 90 parts of water substantially free from salt and this solution can then be injected by use of a proportioning pump into the intake of the principal pump injecting brine into an input well of a water flooding system. The term "water substantially free from salt" should ordinarily be interpreted to mean water containing not more than about 5,000 parts per million of salts. In some cases, however, where two or more brines are injected and one has considerably less salt than the other, some benefits can be obtained by diluting the inhibitor composition with the less saline brine before it is introduced into the more saline one or into a mixture of the brines. This is true even though the less saline brine may contain up to 10,000 or 20,000 parts per million of salt.

It is customary to adjust the concentration of treating compositions to suit the needs of each particular case. For example, if the system contains little hydrogen sulfide, carbon dioxide or bacteria, very little of the treating composition is required. If all types of corrosive agents and several types of bacteria are present, on the other hand, the concentration of treating agent may be as high as 100 parts per million of the water. Generally, a concentration in the range of 10 to 20 parts per million will be found to be adequate for controlling both bacterial growth and corrosion to the desired degree. The concentration may be as much as 10 times these concentrations, or even more if intermittent batch injection is used.

In the treatment of dually completed wells a problem arises in introducing a corrosion inhibitor either into the annular space above a packer or into the bottom of one or more tubing strings in the well. In such cases, the inhibitor composition may have to fall several thousand feet through oil. I have found that a high-density solution of my inhibitor can be formed by preparing an aqueous solution of sugar or glycerin containing about 50 percent of the sugar or glycerin, about 30 percent water and about 20 percent my inhibitor composition. The resulting solution is perfectly clear. Due to its high density, it falls rapidly through the oil and disperses slowly into any water below the oil to inhibit corrosion and any bacterial growth supported by the sugar or glycerin.

Still another application for my inhibitor is in wells where a packer is set between the tubing and casing at a level near the bottom of the tubing and the annular space is filled with a noncorrosive liquid. It is often desirable to weight these so-called packer fluids to oppose entry of brines into the well from formations penetrated by the well. The high-density sugar or glycerin solutions described above develop high hydrostatic pressures when used above packers in wells. My inhibitor composition in this case performs the dual function of inhibiting both corrosion and any bacterial action which might be promoted by the organic materials. In this particular application, something less than 20 percent of my inhibitor composition should, of course, be used. The inhibiting composition can, of course, also be used in unweighted water used as a packer fluid.

My invention will be better understood from consideration of the following examples.

EXAMPLE I

Three quaternary ammonium compounds were prepared according to my invention using Alkyl Pyridines HB as the mixed high-boiling polyalkyl pyridine material. The three quaternizing agents were benzyl chloride, methyl chloride and methyl iodide. Alkyl Pyridines HB is a trademark for the residue from distilling off light alkyl pyridines from the acid extract of the reaction product of ammonia and acetaldehyde. Each quaternary was mixed with a dispersing agent, a solvent and water in the amounts shown in Table A. The resulting mixtures were clear and transparent. Various concentrations of these compositions were added to a brine containing about 650 parts per million of hydrogen sulfide and about 5 percent sodium chloride. The brine solutions containing the inhibitor compositions were all clear and transparent. Test panels about 1 in. by 1 in. by 1/16 in. of mild steel were suspended in the brine solutions for five days. They were then removed, cleaned, dried and reweighed to determine loss of weight due to corrosion. The results are presented in Table A.

*Table A*

| Inhibitor | | | | | |
|---|---|---|---|---|---|
| Composition | | | | Concentration, p.p.m. | Weight loss, milligrams |
| Quaternary | Dispersant | Solvent | Water, percent | | |
| None | None | None | None | Control | 27.0 |
| BAPC,[1] 40% | OX-98, 10% | Isopropanol, 35% | 15 | 5 | 19.7 / 15.0 |
| Do | do | do | 15 | 10 | 5.9 / 5.2 |
| Do | do | do | 15 | 25 | 3.6 / 4.0 |
| Do | do | do | 15 | 50 | 1.6 / 2.1 |
| Do | do | do | 15 | 100 | 1.6 / 2.0 |
| None | None | None | None | Control | 37.2 |
| MAPC,[2] 50% | Triton X-100, 10% | Methanol, 25% | 15 | 25 | 5.0 / 1.9 |
| Do | do | do | 15 | 50 | 2.9 / 3.3 |
| Do | do | do | 15 | 100 | 3.6 / 2.2 |
| None | None | None | None | Control | 21.6 |
| MAPI,[3] 40% | OX-98, 10% | Isopropanol, 35% | 15 | 10 | 3.4 / 4.0 |
| Do | do | do | 15 | 25 | 2.3 / 2.4 |

[1] BAPC is benzyl alkyl pyridinium chloride.
[2] MAPC is methyl alkyl pyridinium chloride.
[3] MAPI is methyl alkyl pyridinium iodide.

In the table, OX-98 is nonyl phenol reacted with about 10 moles of ethylene oxide per mole of nonyl phenol. Triton X-100 is octyl phenol reacted with about 10 moles of ethylene oxide per mole of octyl phenol. The octyl group is highly branched.

The fact that transparent solutions were formed indicates that both the oxylethylated nonyl phenol having a straight alkyl group and the oxylethylated octyl phenol having a highly branched chain were quite satisfactory for forming completely transparent solutions in water containing low concentrations of salt. As will be shown later in Example VI, higher concentrations of these dispersing agents, or dispersants having larger amounts of ethylene oxide, are required to disperse the quaternary in more concentrated brines.

Data in Table A show that all the compositions are highly effective inhibitors for hydrogen sulfide corrosion even at very low concentrations. The reported concentration is for the entire inhibitor composition. The actual concentration of the quaternary is, therefore, only about half the indicated concentration.

In every case, the panels, after exposure to the inhibitor compositions, had a very tough adherent film which was difficult to remove. Removal was, of course, necessary in order to obtain accurate panel weights. This indicated that continuous treatment of flooding water might not be necessary. That is, a tightly adherent film might inhibit corrosion and also prevent bacterial growth on the metal surfaces where it is most objectionable. To check these possibilities, the tests reported in Examples II and III were performed.

EXAMPLE II

To determine the durability of films formed by my inhibiting composition, the inhibitor described in the second test of Table A was used. A solution containing 1,000 parts per million of this inhibitor in brine containing 5 percent sodium chloride and 695 parts per million of hydrogen sulfide was prepared. Duplicate probes of a Corrosometer were immersed in this solution for 10 minutes. The probes were thin strips of mild steel about ⅛ inch wide, about 0.004 inch thick and about 2⅞ inches long. The Corrosometer is an instrument for measuring the resistance of the strips to determine the reduction in cross-section by corrosion. After the 10 minute immersion, the probes were rinsed in water free from salt, hydrogen sulfide and inhibitor. They were then immersed in brine containing 5 percent sodium chloride and 695 parts per million hydrogen sulfide but no inhibitor. Thus, the only inhibiting action was due to the film deposited during the 10 minute exposure to the inhibitor solution. FIGURE 1 of the drawing shows the results of this test. The figure also shows results of a control test in which the procedure was the same but no inhibitor was used and another test in which a commercial inhibitor, a widely used bactericide with corrosion inhibiting properties, was substituted for my inhibitor.

The commercial inhibitor shown in FIGURE 1 is also a quaternary ammonium compound. It will be apparent that this material also forms a film on metal surfaces and that this film provides a substantial degree of corrosion inhibition. The curves also show, however, that my new inhibitor decreases the corrosion rate to only about one-third of that permitted by the commercially available material. This is thought to be due to the tightly adhering nature of the film formed when mixed high-boiling polyalkyl pyridines are used as the base for forming the quaternary ammonium compound.

EXAMPLE III

The composition defined in the second test reported in Table A was also used in coating test panels for bactericidal tests. The same general technique was used as in Example II. Mild steel panels 1 in. by 1 in. by ¹⁄₁₆ in. were immersed for 10 minutes in brine solutions containing 1,000 parts per million of inhibiting composition and 5 percent sodium chloride. They were then rinsed and immersed in the following medium.

| | | |
|---|---|---|
| $H_2O$ | ml | 400 |
| NaCl | g | 40 |
| Tryptone | g | 4 |
| Yeast extract | g | 4 |
| Sodium lactate (60%) | ml | 23 |
| $MgSO_4 \cdot 7H_2O$ | g | 2 |
| $Na_2SO_3$ | g | 0.8 |
| Sea water | ml | 160 |
| Agar | g | 10 | pH adjusted to 7.0 with NaOH.

After two days, a slight growth on the surfaces of the panels was visible. On the controls which had not been immersed in the inhibitor solution, a black layer of bacteria about ¹⁄₃₂-inch thick developed in 24 hours. One of the better water flood corrosion inhibitors having some bactericidal powers permitted a rather thick growth in 48 hours although not quite as thick as developed on the control panels in half the time. The commercial bactericide reported in Example I also permitted slight growth in two days, the amount being about the same as when my inhibitor was used. After a week, the panels treated with my inhibitor had permitted considerable growth, but still not as much as on the control panels after 24 hours. The panels treated with the commercial bactericide were in somewhat better condition. This seems to indicate that if the problem is principally control of bacteria, the commercial bactericide might be preferred. If the principal problem is inhibiting corrosion, however, my inhibitor should be used, not only because of its greater corrosion inhibiting ability but because of its lower cost. The most important indication of this test is that intermittent treatment with film-forming quaternaries may be possible to inhibit not only corrosion but bacterial growth. Obviously, small batch treatments of these film formers in high concentration deposit a film of inhibitor which is effective in preventing, for several days, serious growth of bactericide on metal surfaces where they are most troublesome.

EXAMPLE IV

A bactericidal test of a more customary form was conducted by adding various concentrations of my inhibitor composition to bacteria culture prepared using bacteria isolated from an actual water flooding project in West Texas. In these tests, after the cultures had incubated for four days, the controls showed voluminous colonies of bacteria. So did cultures containing up to 50 parts per million of my inhibitor composition. Cultures containing 75 parts per million of my composition, however, were still clear. One of the duplicate samples containing 75 parts per million showed bacteria colonies after 10 days of incubation. The other showed no colonies after 23 days. It will be apparent again that my inhibitor composition has bactericidal properties. It should be noted, however, that a commercial bactericide prevented bacteria growth for 23 days even when only 25 parts per million were used. This material was not the same as that used in Examples II and III, but was again a quaternary ammonium compound. It had rather poor, although noticeable, corrosion inhibiting ability. Not too much weight should be given the reported concentration ranges required to inhibit bacterial growth since each water flooding project involves different strains of bacteria in different concentrations in different aqueous media. The required concentration of any bactericide should, therefore, be determined independently for each individual project. The important point is that although my quaternary is sufficiently water-insoluble to form an excellent corrosion inhibiting film, the dispersant is able to solubilize the quaternary to such a degree that it is carried throughout the system to be protected and acts as a bactericide not only on metal surfaces but within the body of the solution as well.

EXAMPLE V

To determine which ingredients were essential and which were not, four compositions were prepared and diluted with water. Table B shows the compositions and the results of water dilution.

Table B

| Comp. No. | Composition, percent by weight | | | | Appearance in water | | | |
| --- | --- | --- | --- | --- | --- | --- | --- | --- |
| | BAPC[1] | OX-98 | Alcohol | Water | 100% | 5% | 0.1% | 50 p.p.m. |
| 1 | 40 | 10 | 35 | 15 | Clear | Clear | Clear | Clear. |
| 2 | 40 | 10 | 0 | 50 | do | do | do | do. |
| 3 | 40 | 0 | 60 | 0 | do | Turbid | Turbid | Turbid. |
| 4 | 40 | 0 | 0 | 60 | Turbid | do | do | do. |

[1] Benzyl alkyl pyridinium chloride (reaction product of benzyl chloride and alkyl pyridines HB).

The OX-98 was nonyl phenol reacted with 10 moles of ethylene oxide per mole of nonyl phenol. This was used as the dispersing agent. The alcohol was isopropanol. The water in the composition and in the dilution tests was fresh water. Composition No. 1 is the preferred composition for water having a low salt content. Both the original composition (100%) and all degrees of dilution in water were clear and transparent. The color of the original composition was dark red. The 5 percent solution was wine color. The more dilute solutions were almost colorless.

Composition No. 2 contained no alcohol. Nevertheless, this composition was reasonably liquid and free flowing at about 75° F. This composition was clear and remained clear and transparent through all degrees of dilution. This indicates that alcohol is not a required ingredient for functioning of the composition. As previously noted, however, the alcohol lowers the freezing temperature of the mixture and decreases the viscosity. The latter function becomes important when the more highly oxyethylated dispersing agents, which are in some cases solids, are used. In addition, the alcohol aids in dispersing the quaternary in water.

The third composition in Table B shows that the quaternary dissolves in alcohol to form a clear solution. Upon dilution with water, however, some of the quaternary comes out of solution to form a turbid suspension which deposits tarry black particles on surfaces exposed to the suspension. Much the same results occurred when Composition No. 4 was prepared except in this case the original composition contained two phases. A portion of the quaternary dispersed as a turbid suspension in water particularly when the water was heated. Black tarry particles were deposited from this suspension, however. It will be apparent from the results of diluting Compositions 3 and 4 that a dispersing agent is essential to the function of my water-insoluble quaternary, since otherwise the quaternary is rapidly lost from the water.

EXAMPLE VI

Various dispersing agents were tested for their effectiveness in solubilizing my new quaternary. Some of the results are reported in Table C. In these tests, the quaternary in every case was the reaction product of Alkyl Pyridines HB and benzyl chloride, the alcohol was isopropanol. The concentration of quaternary in every case was 40 percent by weight. In all cases the water concentration was 15 percent by weight. When the concentration of dispersing agent was 10 percent, the concentration of alcohol was, of course, 35 percent by weight. When the dispersing agent concentration was increased to 15 percent, however, the alcohol concentration was decreased to 30 percent. In all tests the inhibitor was first diluted to a 10 percent solution by fresh water or brine, as indicated, and the condition of clarity or tubidity was noted. This 10 percent solution was then diluted to a 1 percent concentration by brine or fresh water, as indicated in Table C, and the condition was again noted.

Table C

| Test No. | Surface active agent | | | 10% solution | | 1% solution | |
| --- | --- | --- | --- | --- | --- | --- | --- |
| | Hydrophobic portion | Moles EtO[1] | Conc., weight percent | Fresh water | Brine | Fresh water | Brine |
| 1 | Nonyl phenol | 10 | 10 | Clear | | Clear | |
| 2 | do | 10 | 10 | | Separated | | Separated. |
| 3 | do | 12 | 10 | | Turbid | | Turbid. |
| 4 | do | 20 | 10 | | Clear | | Clear. |
| 5 | do | 20 | 10 | Hazy | | Hazy | Hazy. |
| 6 | do | 30 | 10 | do | | do | Do. |
| 7 | do | 30 | 15 | do | | Turbid | Do. |
| 8 | Lauryl alcohol | 21 | 10 | do | | Hazy | Do. |
| 9 | do | 21 | 15 | do | | Clear | Clear. |
| 10 | Mercaptan | | 10 | Clear | | do | Turbid. |
| 11 | do | | 15 | do | | do | Clear. |
| 12 | Stearic acid | (2) | 15 | do | | do | Do. |
| 13 | Tallow amine | 2 | 10 | do | | do | Turbid. |
| 14 | do | 2 | 15 | do | | do | Do. |
| 15 | do | 15 | 15 | Turbid | | Hazy | Hazy. |
| 16 | Stearic acid | (3) | 10 | Hazy | | do | Turbid. |
| 17 | do | | 15 | Turbid | | Turbid | Do. |
| 18 | Tall oil | 12 | 15 | do | | do | Do. |
| 19 | Propylene oxide polymer | 6 | 15 | do | | do | Do. |
| 20 | do | 9 | 15 | do | | do | Do. |
| 21 | do | 18 | 15 | do | | do | Do. |
| 22 | Dodecyl benzene sulfonate | 0 | 6 | Separated | | Separated | Separated. |

[1] EtO is ethylene oxide.
[2] Sufficient ethylene oxide was used to make the agent completely water soluble.
[3] Sufficient ethylene oxide used to make agent almost but not quite water soluble.

In the table the observed conditions of solutions of the inhibitor composition in fresh water and in brine have been divided into four degrees of dispersion. These degrees are classified as clear, hazy, turbid, and separated. The term "clear" indicates the solution was transparent. It does not mean the solution was colorless but simply that there were no visible suspended particles in the solution. The term "hazy" indicates that light could pass readily through the solution and objects were visible through an inch or so depth of the solution. For example, printed matter could be read through the solution but it was evident that a small amount of undissolved material was dispersed in the solution. The term "turbid" indicates that the solution was opaque or at best translucent but the undissolved material did not settle rapidly. The term "separated" means that undissolved material separated rapidly from the solution.

The dispersing agents capable of producing clear solutions obviously make up the preferred class of materials. Those forming hazy solutions should be considered operable since they remain dissolved in water except for small traces and are thus carried throughout the system to be treated where they act to inhibit corrosion and bacterial growth. Some of these hazy solutions have some slight tendency to plug a Millipore filter and thus should be used principally where formations have high permeability. In some such areas, water is injected which has a considerable haziness. It will be apparent that a little additional haziness due to the inhibitor composition will not be particularly objectionable in such cases. My hazy solutions are, of course, much more useful than many widely used inhibitors and bactericides which have a much greater tendency to plug formations. Solutions classed as turbid or separated should not be regarded as operable for my purposes since the inhibitor is not sufficiently dissolved in the water to be carried satisfactorily to all parts of the water injection system.

A few of the tests deserve special comment. A comparison of tests 1 and 2 and the results of tests 10, 13, 14, and 16 show the necessity of using a more limited class of agents in brine than the class which can be used in fresh water. Tests 4 and 5 appear to be duplicates in the table, but as the results indicate, actually they are not. The quaternary used in tests 1 to 4, inclusive, was not the same as that used in the remaining tests. The quaternizing reaction was carried to a more complete degree in the case of the quaternary used in the first four tests. This quaternary was more easily dispersed in water than the less completely reacted material used in the remaining tests. This accounts for the haze in the solutions of test 5, whereas, the solutions in test 4 were entirely clear.

A comparison of tests 8 and 9 and tests 10 and 11 shows that higher concentrations of suitable dispersing agents are more effective in forming clear solutions of the quaternary in brine. A comparison of tests 6 and 7 and of tests 16 and 17 indicates that high concentrations of agents having either too much or too little ethylene oxide may actually produce poorer results than lower concentrations.

The results of tests 2, 3, and 4 show the importance of adjusting the ethylene oxide content of the dispersing agent to fit the type of brine used in the injection system. It will be apparent that for best results, both the ethylene oxide content of the dispersing agent and the concentration of the dispersing agent in the inhibitor composition should be adjusted to fit the nature of the water in which the inhibitor is to be used.

EXAMPLE VII

A brine sample from the Skinner formation used in a water injection system in the Deep Fork Field located south of Bristow, Oklahoma was obtained. My quaternary mixed with several concentrations of various surface active agents was mixed into this brine in various concentrations. The results are presented in Table D. In all cases except tests 2, 3, and 8 the inhibitor composition contained 40 percent of the quaternary, 15 percent water, the amount of surface active agent indicated, and sufficient isopropanol to make up 100 percent. In tests 2, 3, and 8, the original compositions contained 10 percent of the nonyl phenol reacted with 10 moles of ethylene oxide. The additional agent was then added to increase the concentration to the indicated value.

Table D

| Test No. | Surface active agent | | | 5% solution | 0.5% solution |
|---|---|---|---|---|---|
| | Hydrophobic portion | Moles EtO[1] | Concentration, weight percent | | |
| 1 | Nonyl phenol | 10 | 10 | Hazy [2] | Hazy. |
| 2 | do | 10 | 12 | Clear | Do. |
| 3 | do | 10 | 20-25 | Clear | Clear. |
| 4 | do | 20 | 10 | Turbid | Do. |
| 5 | do | 20 | 15 | do [3] | Do. |
| 6 | Tridecyl alcohol | 40 | 10 | do | Do. |
| 7 | do | 40 | 15 | do [3] | Do. |
| 8 | Nonyl phenol | 10 | 12 | Clear | Do. |
| | do | 20 | 2-3 | | |
| 9 | do | 10 | 10 | Clear | Do. |
| | do | 20 | 5 | | |
| 10 | do | 10 | 5 | Hazy | Hazy. |
| | do | 20 | 10 | | |
| 11 | do | 10 | 10 | Clear | Clear. |
| | Tridecyl alcohol | 40 | 5 | | |

[1] EtO is ethylene oxide.
[2] Clear first, but clouded in about 2 hours.
[3] Not as turbid as with lower concentrations of surface active agent.

The results of the first test indicate that use of 10 percent of the low ethylene oxide containing agent produced a degree of dispersion which was operable but left something to be desired. The higher concentration used in test 2 gave better results but the dilute solution still was not perfectly clear. Test 3 shows that between 20 and 25 percent of this agent had to be used in the inhibitor composition in order to obtain a perfectly clear solution of my quaternary in this particular brine in all degrees of dilution of the inhibitor composition.

Tests 4 and 5 show the results using an agent having twice as much ethylene oxide as in tests 1, 2 and 3. Here, the dilute solutions were clear while the more concentrated ones were turbid. The use of higher concentrations of the surface active agent improved the degree of dispersion but did not provide clear solutions. The same comments are true for the ethoxylated tridecyl alcohol used in tests 6 and 7.

Tests 8, 9, and 10 show the results of employing combinations of the two agents used in tests 1 to 5. Obviously, the combinations used in tests 8 and 9 are better than either material used alone but the combination used in test 10 is not. A still further test of combinations is shown in tests 11. Here, the hydrophobic portions of the two agents as well as the average length of polyoxyethylene radicals were different. The results were very favorable. The inhibiting composition containing this combination of agents dispersed in the brine more quickly than in tests 8 and 9 and the resulting solution was very clear and sparkling.

These tests show the superiority of certain combinations of surface active agents. The tests also show how a few simple routine tests with inexpensive, readily available nonionic agents can be used to select quickly a type and concentration of agent or combination of agents capable of forming a perfectly clear stable dispersion of my quaternary in a particular brine.

EXAMPLE VIII

Tests were run to determine the effects of salt concentration, and methods of introducing the inhibitor, on the type of dispersion obtained. Results are shown in Table E. The 250,000 p.p.m. brine was formed by weighing out 540 grams of sodium chloride and 60 grams of calcium chloride and dissolving the salts in sufficient water to give two liters of solution. The resulting solution contained 25 percent (250,000 p.p.m.) salts. The 180,000 p.p.m. brine was obtained by taking 667 ml. of the original solution and diluting it with fresh water to a volume of one liter. The other brines were obtained by further dilutions. In tests 1 to 8, the inhibitor compositions were added directly to the brine. In tests 9 to 12, the inhibitor compositions were first diluted to 10 percent solution in fresh water and were then blended with the brine. In all cases the inhibitor composition contained 40 percent of the quaternary, 15 percent water, the indicated amount of surface active agent, and the remainder isopropanol.

be somewhat sensitive to temperature changes. Actually, the difference is not too important since, as explained in Example VI (hazy solutions should be regarded as operative since all but a trace of the quaternary is dispersed to Table E

| Test No. | Surface active agent | | | 250,000 p.p.m. salt, inhibitor conc. | | | 180,000 p.p.m. salt, inhibitor conc. | | | 95,000 p.p.m. salt, inhibitor conc. | | | 10,000 p.p.m. salt, inhibitor conc. | | | No salt, inhibitor conc. | | |
|---|---|---|---|---|---|---|---|---|---|---|---|---|---|---|---|---|---|---|
| | Hydrophobic portion | Moles EtO[1] | Conc., weight percent | 10% | 5% | 1% | 10% | 5% | 1% | 10% | 5% | 1% | 10% | 5% | 1% | 10% | 5% | 1% |
| 1 | Nonyl phenol | 10 | 10 | ---- | Sep_ | Sep_ | ---- | Sep_ | Sep_ | ---- | Sep_ | Sep_ | ---- | Clr_ | Clr_ | ---- | Clr_ | Clr. |
| | ----do---- | 20 | 5 | | | | | | | | | | | | | | | |
| 2 | ----do---- | 10 | 5 | ---- | Sep_ | Sep_ | ---- | Tur_ | Hazy_ | ---- | Clr_ | Hazy_ | ---- | Clr_ | Clr_ | ---- | Hazy_ | Hazy. |
| | ----do---- | 20 | 10 | | | | | | | | | | | | | | | |
| 3 | ----do---- | 10 | 10 | ---- | Sep_ | Sep_ | ---- | Tur_ | ---do_ | ---- | Clr_ | Clr_ | ---- | Clr_ | Clr_ | Clr_ | Clr_ | Clr. |
| | Tridecyl alcohol | 40 | 5 | | | | | | | | | | | | | | | |
| 4 | ----do---- | 40 | 10 | ---- | Sep_ | Sep_ | ---- | Tur_ | Tur_ | ---- | Tur_ | Hazy_ | ---- | Tur_ | Hazy_ | ---- | Tur_ | Hazy. |
| | Nonyl phenol | 10 | 5 | | | | | | | | | | | | | | | |
| 5 | Tridecyl alcohol | 40 | 10 | ---- | Sep_ | Sep_ | ---- | Sep_ | Sep_ | ---- | Tur_ | Tur_ | ---- | Tur_ | Hazy_ | ---- | Tur_ | Do. |
| 6 | Mercaptan | | 15 | | | | Sep_ | Sep_ | Sep_ | Sep_ | Sep_ | Sep_ | | | | Hazy_ | ---do_ | |
| 7 | Stearic acid | | 15 | | | | Sep_ | Sep_ | Tur_ | Tur_ | Tur_ | Hazy_ | | | | ---do_ | | |
| 8 | Nonyl phenol | 10 | 10 | | | | Sep_ | Sep_ | Tur_ | Tur_ | Tur_ | ---do_ | | | | | | |
| | ----do---- | 30 | 5 | | | | | | | | | | | | | | | |
| 9 | ----do---- | 10 | 10 | | | | | | Clr.[3] | | | Clr.[2] | | | | | Clr_ | |
| | Tridecyl alcohol | 40 | 5 | | | | | | | | | | | | | | | |
| 10 | Mercaptan | | 15 | | | | | | Hazy[3] | | | Hazy[2] | | | | Hazy_ | ---do_ | |
| 11 | Stearic acid | | 15 | | | | | | Clr.[3] | | | ---do.[2] | | | | ---do_ | | |
| 12 | Tridecyl alcohol | 12 | 10 | | | | | | Clr.[3] | | | ---do.[2] | | | | Tur_ | | |
| | ----do---- | 40 | 5 | | | | | | | | | | | | | | | |

[1] EtO is ethylene oxide.
[2] 10% solution in fresh water mixed with equal volume of 180,000 p.p.m. brine.
[3] 5% solution in 95,000 p.p.m. brine mixed with 4 times volume of 180,000 p.p.m. brine.

It will be apparent that no surface active agent or combination of agents tested was able to give a satisfactory dispersion of my quaternary in a brine containing 25 percent by weight of salts. By diluting two parts of this brine with one of fresh water, however, to give a salt concentration of 180,000 p.p.m. (18 percent), tests 3 and 4 show that some combinations of surface active agents will form satisfactory, although not ideal, dispersions of my quaternary in the brine. Tests 9, 11, and 12 show that even better results can be obtained by diluting the inhibitor composition with fresh water before it is mixed with the brine. Test 9 shows that the combination of ethoxylated nonyl phenol and tridecyl alcohol is outstanding in this regard. A comparison of tests 6 and 7 with tests 10 and 11 using 180,000 p.p.m. brine illustrates clearly the advantage of pre-diluting the inhibitor composition with fresh water before introducing the inhibitor into brine.

Tests with 95,000 p.p.m. (9.5 percent) brine show that several agents are suitable for forming dispersions of my quaternary in this brine. Again, superiority of the combination of ethoxylated nonyl phenol and tridecyl alcohol is to be noted. At a brine concentration of 10,000 p.p.m. (1 percent) even the nonyl phenol reacted with 10 moles of ethylene oxide becomes perfectly satisfactory.

The principal point of interest in connection with the tests using fresh water is that the ethoxylated mercaptan and stearic acid used in tests 6, 7, 10, and 11 produced hazy solutions in fresh water whereas in Example VI, tests 10, 11, and 12, the same agents seemed to form clear solutions. The explanation of the difference seems to lie in the unfortunate lack of a numerical standard which could be used to give a more quantitative idea of the degrees of clarity or haziness. The tests in Example VI were run by a different worker than those in Example VIII. In addition, at the time the tests in Example VI were made, the advantages of combined dispersing agents had not been discovered. Therefore, without the completely clear and sparkling solutions provided by the combinations to use as a comparison, the worker in Example VI was more inclined to call a solution clear than the worker in Example VIII where the very clear solutions in tests 3 and 9 were available for comparison. Differences in temperature might also account for some of the reported differences in results. Solubilized solutions are known to a degree where it will be carried throughout all parts of the system to be protected and perform its dual function of inhibiting corrosion and bacterial growth.

EXAMPLE IX

To determine the plugging tendency of brine containing my inhibitor a so-called "Millipore" filter was used. This filter is described in an article appearing in the Petroleum Engineer for November 1956, page B53. The particular Millipore discs had an average pore size of .45 micron. In each case, the Millipore disc was mounted so a half-pound differential pressure could be maintained across it. Brine solutions containing 5 percent sodium chloride and my inhibitor were then allowed to flow through the filter and the rate of flow was measured over a period of time. FIGURE 2 of the drawing shows a plot of the data together with data for the brine alone and the brine containing other inhibitors and bactericides.

In FIGURE 2 the top curve shows the flow rate of the brine itself. A comparison of this curve to the one just below it shows that brine solutions of my new inhibitor flow through the filter almost as easily as the brine itself. This inhibitor had the composition shown in the second test reported in Table A. The next lower curve in FIGURE 2 shows the plugging action of my new quaternary in the absence of a dispersing agent. A comparison of this curve to the one just above demonstrates the effectiveness of the dispersing agent in solubilizing the quaternary and thus avoiding any tendency of the material to plug porous media having low permeabilities. The next two curves in FIGURE 2 show that the commercial inhibitor had some tendency to plug the filter although the tendency was not serious. This inhibitor is the same as that reported in Examples II and III. Obviously, Triton X-100 was not able to solubilize the portion of this inhibitor responsible for the plugging action. The bottom curve shows the plugging tendency of another commercial inhibitor. This is a commonly used corrosion inhibitor with at least some small degree of bactericidal properties. It is important to note that in spite of the tendency of this inhibitor to plug Millipore filters, it has been used in some areas for many months with apparent success. It will be apparent, however, that the material should not be used where formations have low permeabilities. My composition, on the other hand, can be used with confidence in formations having very low permeabilities.

EXAMPLE X

To determine the effectiveness of my composition as an inhibitor of corrosion by carbon dioxide and water-soluble carboxylic acids, the following test was run. A 2,000 ml. flask was filled with 1,100 ml. of 5 percent sodium chloride solution and 800 ml. of kerosene. The flask was placed under a reflux condenser and the water was boiled for about 2 hours. During this time, a stream of carbon dioxide was bubbled into the water to free it from air and saturate the water with carbon dioxide. About 1.1 ml. of the composition defined in the second test of Table A were then added to the liquids in the flask together with 0.55 ml. of glacial acetic acid. Mild steel test coupons, 1 in. x 1 in. x 1/16 in., were suspended in the water. Refluxing of the water in the flask was then continued for 24 hours while the flow of carbon dioxide through the water was continued. The test panels were automatically raised into the oil layer for about 7 seconds every minute. This is a portion of the test which is designed for testing inhibitors for use in oil wells. It has no great significance in this case since little oil is ordinarily present in water systems for flooding or disposal. After 24 hours, the panels were removed, cleaned, dried and re-weighed to determine the weight loss. The results are reported in Table F together with similar tests using the quaternary formed using methyl iodide as the quaternizing agent. Duplicate tests were run with each inhibitor together with a control test using no inhibitor.

*Table F*

| Test No. | Inhibitor | | Weight loss, milligrams |
|---|---|---|---|
| | Type | Conc., p.p.m. | |
| 1 | None | Control | 144.7 |
| 2 | BAPC [1] | 100 | 15.0 / 10.5 |
| 3 | None | Control | 161.2 |
| 4 | MAPI [2] | 100 | 31.6 / 40.5 |

[1] BAPC is benzyl alkyl pyridinium chloride (the reaction product of benzyl chloride and alkyl pyridines HB).
[2] MAPI is methyl alkyl pyridinium iodide (the reaction product of methyl iodide and alkyl pyridines HB).

The results shown in Table F demonstrate that both quaternaries tested are effective inhibitors against corrosion by the carbon dioxide and water-soluble carboxylic acids frequently found in water systems. It appears that the benzyl chloride derivitive is somewhat more effective for this purpose than that formed with methyl iodide.

I claim:

1. A water-soluble composition for inhibiting bacterial growth and corrosion by hydrogen sulfide, carbon dioxide and water-soluble carboxylic acids comprising the quaternary ammonium compound of benzyl chloride and the residue boiling between about 200° C. and about 350° C. from the distillation of the acid extract of the reaction product of ammonia and acetaldehyde; and sufficient of a combination of surface-active agents to form substantially clear solutions when said composition is diluted with water, said combination containing about 2 parts of the reaction product of a 1 mole of monyl phenol with from about 8 to about 20 moles of ethylene oxide, and about 1 part of the reaction product of 1 mole of tridecyl alcohol with from about 30 to about 50 moles of ethylene oxide.

2. In a water injection process in which water is caused to flow through surface equipment, down a well and into a formation, and in which corrosion by hydrogen sulfide occurs, the improvement comprising causing to flow through said surface equipment and down said well an aqueous solution containing at least about 2 parts per million by weight of a water-insoluble quaternary ammonium compound formed from an organic quaternizing agent and mixed polyalkyl pyridines boiling above about 200° C., said polyalkyl pyridines being the reaction product of ammonia with an organic chemical selected from the group consisting of acetylene and acetaldehyde, said quaternary ammonium compound being present in a concentration sufficient to inhibit corrosion and bacterial growth; and sufficient of a water-soluble ethoxylated surface-active agent to cause said quaternary ammonium compound to form a substantially clear solution in said water, said surface-active agent containing a hydrocarbon radical having at least about 12 carbon atoms of which at least about 8 are in an aliphatic portion.

3. The method of claim 2 in which said aqueous solution contains at least about 100 parts per million by weight of said quaternary ammonium compound, and is introduced in slugs between volumes of the main body of water being introduced.

4. The method of claim 2 in which said quaternary ammonium compound is formed from a quaternizing selected from the group consisting alkyl and aryl alkyl halides, and the residue boiling above about 200° C. from the distillation of the reaction product of ammonia and acetaldehyde and said surface-active agent is a nonionic agent having a hydrocarbon radical containing at least about 12 carbon atoms of which at least about 8 are in an aliphatic portion, and having a polyoxyethylene chain containing an average of from about 8 to about 30 oxyethylene units.

5. The method of claim 2 in which said quaternary ammonium compound is formed from benzyl chloride and the residue boiling between about 200° C. and about 350° C. from the distillation of the acid extract of the reaction product of ammonia and acetaldehyde and said surface-active agent is a combination of about 2 parts of the reaction product of 1 mole of nonyl phenol with from about 8 to about 20 moles of ethylene oxide and about 1 part of the reaction product of 1 mole of tridecyl alcohol with from about 30 to about 50 moles of ethylene oxide.

6. In the method of claim 2 in which the water into which said quaternary ammonium compound is to be dispersed by said surface-active agent is a brine, the improvement comprising diluting a mixture of said quaternary ammonium compound and said surface-active agent with water substantially free from salt before said quaternary ammonium compound and said surface-active agent are introduced into said brine.

7. The method of claim 4 in which said aqueous solution contains at least about 100 parts per million by weight of said quaternary ammonium compound, and is introduced in slugs between volumes of the main body of water being introduced.

8. The method of claim 5 in which said aqueous solution contains at least about 100 parts per million by weight of said quaternary ammonium compound, and is introduced in slugs between volumes of the main body of water being introduced.

References Cited in the file of this patent

UNITED STATES PATENTS

| | | |
|---|---|---|
| 2,446,796 | Van Campen et al. | Aug. 10, 1948 |
| 2,472,400 | Bond | June 7, 1949 |
| 2,692,231 | Stayner et al. | Oct. 19, 1954 |
| 2,814,593 | Beiswanger et al. | Nov. 26, 1957 |
| 2,822,330 | Riggs et al. | Feb. 4, 1958 |
| 2,839,465 | Jones | June 17, 1958 |
| 2,867,279 | Cocks | Jan. 6, 1959 |
| 2,877,228 | Mahan | Mar. 10, 1959 |
| 2,882,227 | Lindberg | Apr. 14, 1959 |
| 2,917,428 | Hitzman | Dec. 15, 1959 |
| 2,955,083 | Levin | Oct. 4, 1960 |

OTHER REFERENCES

Ito: Tar Base as Corrosion Inhibitor, article in Chemical Abstracts, vol. 50 (1956), cols. 16,632 and 16,633.

UNITED STATES PATENT OFFICE
CERTIFICATE OF CORRECTION

Patent No. 3,033,784                          May 8, 1962

Loyd W. Jones

It is hereby certified that error appears in the above numbered patent requiring correction and that the said Letters Patent should read as corrected below.

Column 9, line 29, for "patrs" read -- parts --; columns 15 and 16, Table E, heading to column 7, line 2 thereof, strike out "salt,"; column 16, line 41, after "discs" insert -- used --; column 17, line 64, for "a 1 mole of monyl" read -- 1 mole of nonyl --; column 18, line 20, after "quaternizing" insert -- agent --; line 21, after "consisting" insert -- of --.

Signed and sealed this 30th day of October 1962.

(SEAL)
Attest:

ERNEST W. SWIDER
Attesting Officer

DAVID L. LADD
Commissioner of Patents